(12) United States Patent
Tabei et al.

(10) Patent No.: US 10,986,272 B2
(45) Date of Patent: Apr. 20, 2021

(54) IMAGE CAPTURING DEVICE AND CAPTURED IMAGE DISPLAY METHOD

(71) Applicant: PANASONIC INTELLECTUAL PROPERTY MANAGEMENT CO., LTD., Osaka (JP)

(72) Inventors: Kenji Tabei, Kanagawa (JP); Shogo Tanaka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/489,248

(22) PCT Filed: Jan. 19, 2018

(86) PCT No.: PCT/JP2018/001495
§ 371 (c)(1),
(2) Date: Aug. 27, 2019

(87) PCT Pub. No.: WO2018/159145
PCT Pub. Date: Sep. 7, 2018

(65) Prior Publication Data
US 2020/0068130 A1 Feb. 27, 2020

(30) Foreign Application Priority Data
Mar. 3, 2017 (JP) .............................. JP2017-040423

(51) Int. Cl.
*H04N 5/232* (2006.01)
(52) U.S. Cl.
CPC ..... *H04N 5/23267* (2013.01); *H04N 5/23254* (2013.01); *H04N 5/23293* (2013.01)

(58) Field of Classification Search
CPC ........... H04N 5/23267; H04N 5/23254; H04N 5/23293
See application file for complete search history.

(56) References Cited

U.S. PATENT DOCUMENTS

2001/0022619 A1* 9/2001 Nishiwaki .......... H04N 5/23267
348/208.99
2006/0115297 A1 6/2006 Nakamaru
(Continued)

FOREIGN PATENT DOCUMENTS

JP 2006-100903 A 4/2006
JP 2006-157428 A 6/2006
(Continued)

OTHER PUBLICATIONS

U.S. Appl. No. 16/486,377 to Shogo Tanaka et al., filed Aug. 15, 2019.
(Continued)

*Primary Examiner* — Nicholas G Giles
(74) *Attorney, Agent, or Firm* — Greenblum & Bernstein, P.L.C.

(57) ABSTRACT

An object of the present disclosure is to display a captured image and a shake corrected image thereof on the same screen. An imaging device is provided and has a configuration provided with a correction amount calculator that calculates a correction amount for correcting image shake in a frame image, a shake corrected image generator that generates a shake corrected image in which the image shake is corrected by performing a geometrical conversion with respect to a current frame image based on the correction amount, and a synthesized image generator that generates a synthesized image in which the current frame image and the shake corrected image are disposed on the same screen.

7 Claims, 7 Drawing Sheets

(56) References Cited

U.S. PATENT DOCUMENTS

| | | | |
|---|---|---|---|
| 2007/0140579 A1 | 6/2007 | Miyashita | |
| 2009/0244311 A1* | 10/2009 | Eom | ................. H04N 5/23293 348/222.1 |
| 2010/0208102 A1 | 8/2010 | Kuriyama | |
| 2011/0304738 A1 | 12/2011 | Murakami | |
| 2012/0177346 A1 | 7/2012 | Kuriyama | |
| 2015/0097976 A1 | 4/2015 | Nakanishi et al. | |

FOREIGN PATENT DOCUMENTS

| | | |
|---|---|---|
| JP | 2006-340063 A | 12/2006 |
| JP | 2007-081685 A | 3/2007 |
| JP | 4162333 B2 | 10/2008 |
| JP | 4280363 B2 | 6/2009 |
| JP | 2010-193063 A | 9/2010 |
| JP | 2013-066046 A | 4/2013 |
| JP | 2015-095670 A | 5/2015 |
| WO | 2007/072870 A1 | 6/2007 |
| WO | 2013/088688 A1 | 6/2013 |

OTHER PUBLICATIONS

International Search Report issued in WIPO Patent Application No. PCT/JP2018/001495, dated Apr. 3, 2018.

\* cited by examiner

IMAGE CAPTURING DEVICE AND CAPTURED IMAGE DISPLAY METHOD

TECHNICAL FIELD

The present disclosure relates to an imaging device and a captured image display method, and more specifically, to an imaging device that images captured images consisting of a plurality of frame images in time series by an imaging element and a display method of a captured image imaged by the imaging device.

BACKGROUND ART

In the related art, for the purpose of correcting image shake in a captured image generated when a monitoring camera shakes, there is known a technology configured to detect a shake of a monitoring camera by a vibration detection means (vibration sensor) and instruct a shake correction mode with respect to a shake correction means for performing a shake correction of the captured image (PTL 1) in accordance with the analysis result of detected shake component.

CITATION LIST

Patent Literature

PTL 1: Japanese Patent No. 4162333

SUMMARY OF THE INVENTION

In a surveillance system, a television broadcasting system, or the like, for example, at the time of a disaster such as an earthquake, in order to grasp the degree of shaking of a subject, it is generally performed to display the captured image as it is without correcting image shake. However, in order to grasp the detailed situation of the disaster, it is desirable to display a shake corrected image in which the image shake in the captured image is corrected. This applies not only at the time of a disaster such as an earthquake, but also at a case where image shake occurs in a captured image due to wind, traffic vibration or the like.

The present disclosure has been made in view of the problems of the related art as described above, and aims to provide an imaging device and a captured image display method which are capable of displaying both a captured image and a shake corrected image, in which image shake of the captured image is corrected, on the same screen.

According to an aspect of the present disclosure, there is provided an imaging device for imaging captured images consisting of a plurality of frame images in time series by an imaging element, the device including: a correction amount calculator that calculates a correction amount for correcting image shake in a current frame image; a shake corrected image generator that generates a shake corrected image in which the image shake is corrected by performing a geometrical conversion with respect to the current frame image based on the correction amount; and a synthesized image generator that generates a synthesized image in which the current frame image and the shake corrected image are disposed on the same screen.

According to the present disclosure, it is possible to display both a captured image and a shake corrected image, in which image shake of the captured image is corrected, on the same screen.

DESCRIPTION OF EMBODIMENTS

Figure 1:
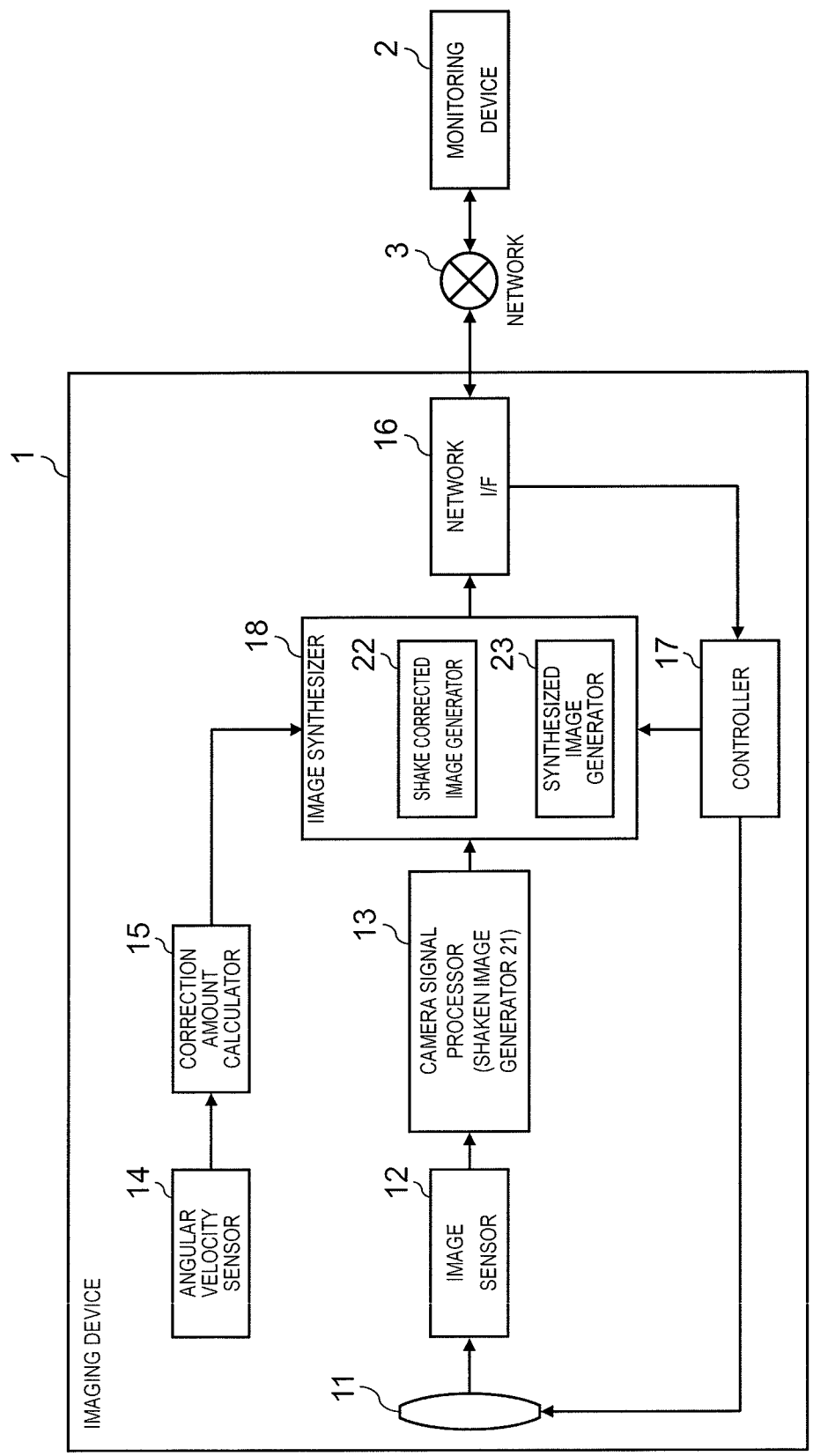
FIG. 1 is a schematic configuration diagram of an imaging device according to a first exemplary embodiment of the present disclosure.

According to a first aspect of the present disclosure, there is provided an imaging device for imaging captured images consisting of a plurality of frame images in time series by an imaging element, the device including: a correction amount calculator that calculates a correction amount for correcting image shake in a current frame image; a shake corrected image generator that generates a shake corrected image in which the image shake is corrected by performing a geometrical conversion with respect to the current frame image based on the correction amount; and a synthesized image generator that generates a synthesized image in which the current frame image and the shake corrected image are disposed on the same screen.

In the imaging device according to the first aspect, since it is possible to generate the synthesized image in which the current frame image and the shake corrected image are disposed on the same screen, both the captured image and the shake corrected image, in which the image shake is corrected, can be displayed on the same screen.

In a second aspect based on the above first aspect, the synthesized image is configured with a master screen and a slave screen which is disposed on the master screen, and, one of the current frame image and the shake corrected image is disposed on the master screen, and the other is disposed on the slave screen, by the synthesized image generator.

In the imaging device according to the second aspect, since the current frame image and the shake corrected image can be disposed on the master screen and the slave screen, it is possible to display both images in an easy-to-see manner.

In a third aspect based on the above first aspect, the synthesized image generator changes a screen size of at least one of the master screen and the slave screen, and a disposition position of the slave screen on the master screen, according to a command input from a user.

In the imaging device according to the third aspect, the screen size of the master screen or the slave screen, and the disposition position of the slave screen can be freely changed according to the user's request.

In a fourth aspect based on the above first aspect, the synthesized image is configured with a first screen and a second screen disposed side by side in a left-and-right direction or up-and-down direction, and one of the current frame image and the shake corrected image is disposed on the first screen, and the other is disposed on the second screen, by the synthesized image generator.

In the imaging device according to the fourth aspect, since the current frame image and the shake corrected image can be disposed on the first screen and the second screen which are disposed side by side in the left-and-right direction or up-and-down direction, it is possible to display both images in an easy-to-see manner.

In a fifth aspect based on the above fourth aspect, the synthesized image generator changes screen sizes of the first screen and the second screen according to a command input from a user.

In the imaging device according to the fifth aspect, the screen sizes of the first screen or the second screen can be freely changed according to the user's request.

In a sixth aspect based on any one of the above first to fifth aspects, the imaging device further includes a shaken image generator that generates a shaken image including the image shake by performing the geometrical conversion with respect to the shake corrected image based on the correction amount, in which the synthesized image generator uses the shaken image instead of the current frame image.

In the imaging device according to the sixth aspect, even when the shake corrected image is generated by controlling the horizontal and vertical displacements of the image sensor based on the correction amount calculated by the correction amount calculator, it is possible to generate a shaken image corresponding to the current frame image before correcting the image shake from the shake corrected image.

According to a seventh aspect of the present disclosure, there is provided a display method of captured images consisting of a plurality of frame images imaged in time series by an imaging element, the method including: a step of calculating a correction amount for correcting image shake in a current frame image; a step of generating a shake corrected image in which the image shake is corrected by performing a geometrical conversion with respect to the current frame image based on the correction amount; and a step of generating a synthesized image in which the current frame image and the shake corrected image are disposed on the same screen.

In the display method of captured images according to the seventh aspect, since it is possible to generate the synthesized image in which the current frame image and the shake corrected image are disposed on the same screen, both the captured image and the shake corrected image, in which the image shake is corrected, can be displayed on the same screen.

Hereinafter, exemplary embodiments of the present disclosure will be described with reference to the drawings.

In the present exemplary embodiment, a case where imaging device 1 according to the present disclosure is used as a surveillance camera will be described. Imaging device 1 is attached to, for example, a telephone pole, a pole or the like. Therefore, when the telephone pole or the pole shakes due to an earthquake, a wind, a traffic vibration or the like, imaging device 1 also shakes, so that image shake occurs in a captured image which is captured by imaging device 1.

First Exemplary Embodiment

FIG. 1 is a schematic configuration diagram of imaging device 1 according to a first exemplary embodiment of the present disclosure. Imaging device 1 is connected to monitoring device 2 (monitoring terminal) installed in a monitoring headquarters or the like via network 3. Imaging device 1 is provided with lens system 11 including a zoom lens, image sensor 12, camera signal processor 13, angular velocity sensor 14, correction amount calculator 15, network interface (I/F) 16, controller 17, and image synthesizer 18.

Lens system 11 including the zoom lens condenses imaging light from a subject and forms an image of the subject on an imaging surface of image sensor 12. Image sensor 12 is a complementary metal oxide semiconductor (CMOS), and converts the image of the subject formed on the imaging surface into an electrical signal at a predetermined frame period (imaging period). Camera signal processor 13 performs various signal processing with respect to the image signal generated by image sensor 12 and generates a frame image (image data).

When imaging device 1 shakes and image shake occurs in a captured image, a frame image generated by image sensor 12 becomes a shaken image including image shake. In the first exemplary embodiment, it is assumed that the frame image generated by image sensor 12 is a shaken image. Therefore, in the first exemplary embodiment, image sensor 12 can be regarded as shaken image generator 21 that generates a shaken image.

Angular velocity sensor 14 detects how much an angle of imaging device 1 changes per unit time, that is, detects a physical shake amount. Specifically, a rotational angular velocity in a left-and-right direction (pan direction) of imaging device 1 and a rotational angular velocity in an up-and-down direction (tilt direction) of imaging device 1 are detected, respectively. Based on the rotational angular velocity detected by angular velocity sensor 14, correction amount calculator 15 calculates a correction amount for correcting image shake in a frame at current point (hereinafter referred to as "current frame").

Figure 2:
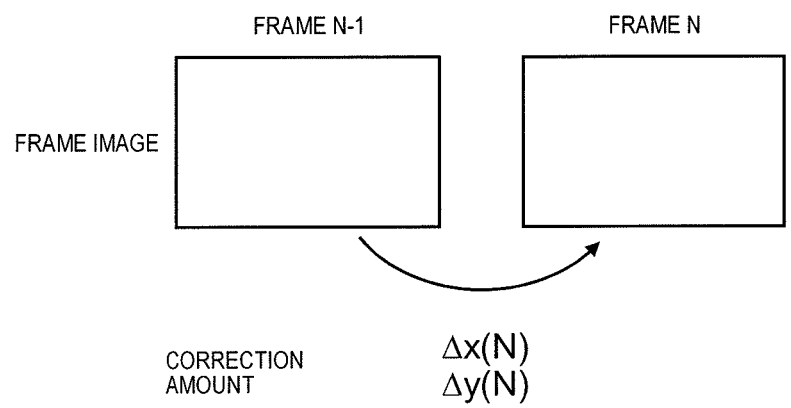
FIG. 2 is a diagram for explaining a relationship between a rotational angular velocity and a correction amount.

FIG. 2 is a diagram for explaining a relationship between a rotational angular velocity and a correction amount. Correction amount calculator 15 obtains an average movement amount ($\Delta x$, $\Delta y$) of the subject in a frame image in the left-and-right direction (x direction) and the up-and-down direction (y direction), between the current frame (frame N) and the previous frame (frame N−1). The average movement amount ($\Delta x$, $\Delta y$) can be obtained by converting a rotational angular velocity of angular velocity sensor 14 into a displacement amount of the subject in the x direction and the y direction using a known method in the related art. The obtained average movement amount ($\Delta x$, $\Delta y$) becomes a correction amount "$\Delta x(N)$, $\Delta y(N)$" of the current frame (frame N). The correction amount calculated by correction amount calculator 15 is input to image synthesizer 18. Network I/F 16 is an interface for connecting imaging device 1 to network 3.

Network I/F 16 receives a command for instructing a shake correction in the captured image and a command for instructing an image synthesizing method, from monitoring device 2 via network 3. The commands received by network I/F 16 from monitoring device 2 are input to controller 17. Network I/F 16 also transmits synthesized image 33 (see FIG. 3), which will be described later, generated by image synthesizer 18 to monitoring device 2 via network 3.

Controller 17 can be configured with a processor, and is for collectively controlling each processing of imaging device 1 including the shake correction of the captured image and generation of a synthesized image, and controls each processing of imaging device 1 based on a control program stored in advance in a read only memory (ROM) (not shown) and each command input from network I/F 16.

Image synthesizer 18 has shake corrected image generator 22 that generates a shake corrected image in which image shake is corrected by performing a geometrical conversion with respect to a frame image of the current frame based on the correction amount calculated by correction amount calculator 15, and synthesized image generator 23 that generates synthesized image 33 in which a shaken image and the shake corrected image are disposed on the same screen.

Figure 3:
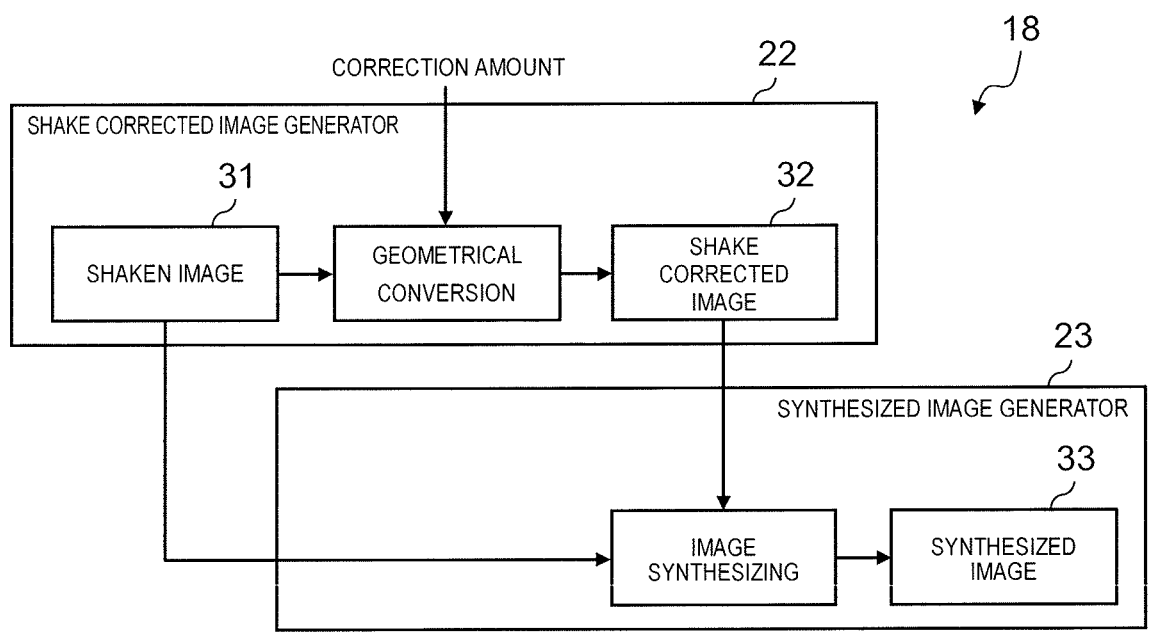
FIG. 3 is a diagram showing processing in an image synthesizer.
Figure 4:
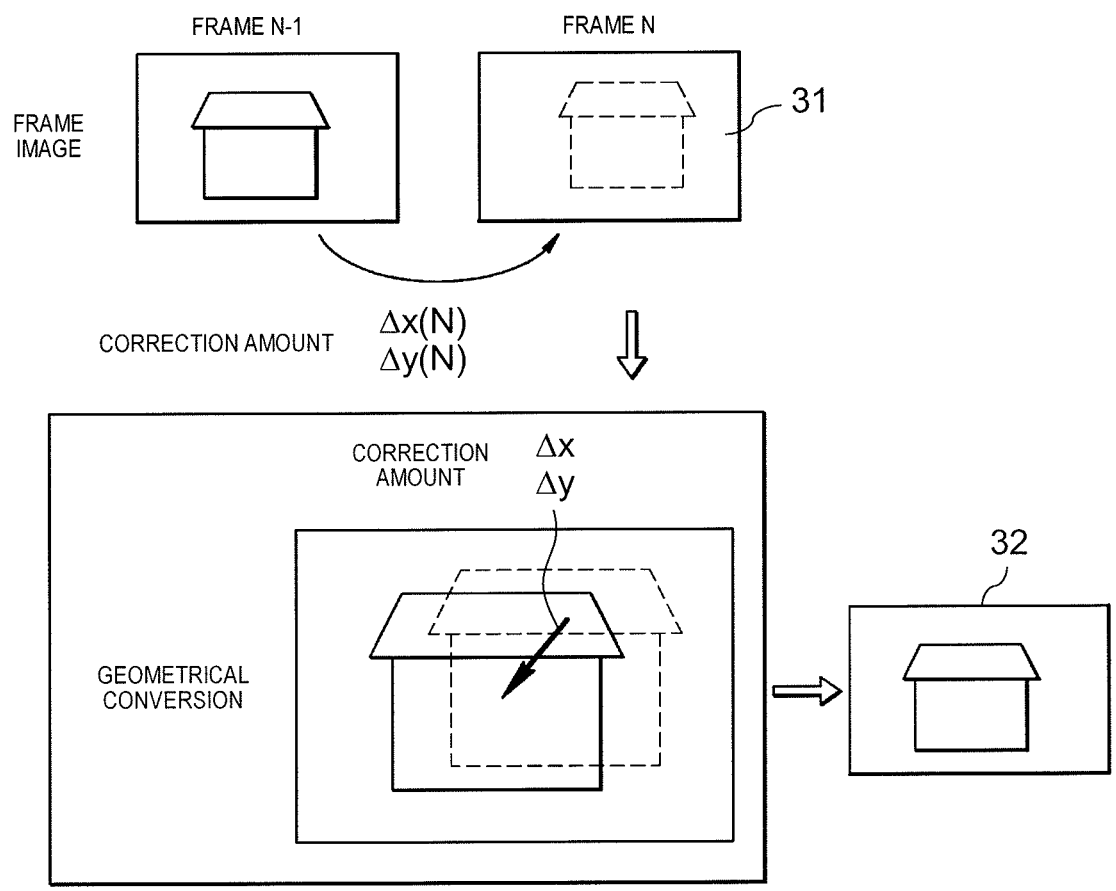
FIG. 4 is a diagram for explaining geometrical conversion processing in a shake corrected image generator.

FIG. 3 is a diagram showing processing in image synthesizer 18, and FIG. 4 is a diagram for explaining geometrical conversion processing in shake corrected image generator 22.

First, shake corrected image generator 22 acquires a frame image (image data) of the current frame (frame N) from camera signal processor 13. As described above, the frame image generated by camera signal processor 13 is shaken image 31 including image shake. Shake corrected image generator 22 acquires a correction amount "$\Delta x(N)$, $\Delta y(N)$" of the current frame (frame N) from correction amount calculator 15.

Subsequently, as shown in FIG. 4, and based on the correction amount "$\Delta x(N)$, $\Delta y(N)$", shake corrected image generator 22 generates a shake corrected image 32 that is the frame image in which the image shake is corrected by performing a geometrical conversion with respect to shaken image 31 which is the frame image of the current image (frame N).

Next, synthesized image generator 23 generates synthesized image 33 in which shaken image 31 and shake corrected image 32 are synthesized such that both images are disposed on the same screen. A method for synthesizing shaken image 31 and shake corrected image 32 follows a command for instructing a control program stored in advance in a ROM (not shown) or a command for instructing an image synthesizing method received from monitoring device 2. Shaken image 31 and shake corrected image 32 can be synthesized by using, for example, a picture-in-picture (PinP) method, a two-screen split method, or the like. The method for synthesizing shaken image 31 and shake corrected image 32 is not limited to the PinP method or the two-screen split method, and various other methods may be used.

Figure 5:
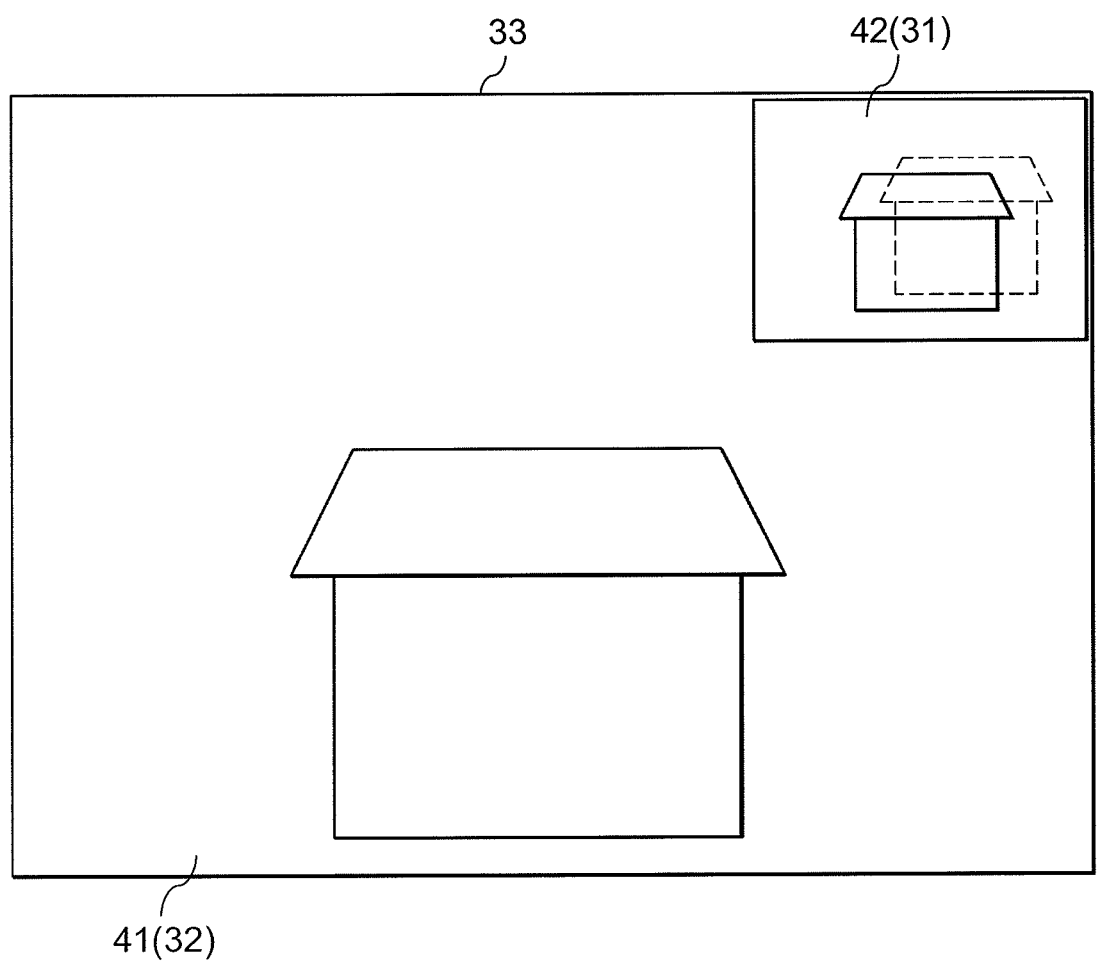
FIG. 5 is a diagram showing an example of a synthesized image synthesized by using a PinP method.

FIG. 5 is a diagram showing an example in which shaken image 31 and shake corrected image 32 are synthesized by using the PinP method. In the example of FIG. 5, synthesized image 33 is configured with master screen 41 and slave screen 42 which is disposed on master screen 41. Synthesized image generator 23 synthesizes shaken image 31 and shake corrected image 32 such that shake corrected image 32 is disposed on master screen 41 and shaken image 31 is disposed on slave screen 42. The screen size of shaken image 31 is reduced to fit the screen size of slave screen 42.

Further, the screen size of slave screen 42 can be changed based on a command from a user which is input from monitoring device 2. That is, the screen size of slave screen 42 may be changed to a screen size larger or smaller than the screen size shown in FIG. 5. A disposition position of slave screen 42 on master screen 41 can also be changed based on the command from the user. For example, in the example of FIG. 5, slave screen 42 is disposed at an upper right position on master screen 41, but the disposition position of slave screen 42 can be changed to a lower right, upper left, or lower left position on master screen 41.

Further, slave screen 42 (shaken image 31) may be displayed at all times, or may be displayed only when angular velocity sensor 14 detects a shake of imaging device 1 at a certain value or more or only when a user of monitoring device 2 (monitoring staff) desires. When slave screen 42 (shaken image 31) is displayed only when imaging device 1 shakes or only when the user desires, a load on the user of monitoring device 2 when monitoring the captured image which is captured by imaging device 1 can be reduced.

In the example of FIG. 5, the synthesis is performed such that shake corrected image 32 is disposed on master screen 41 and shaken image 31 is disposed on slave screen 42, but conversely, the synthesis may be performed such that shaken image 31 is disposed on master screen 41 and shake corrected image 32 is disposed on slave screen 42. In this case, the screen size of shake corrected image 32 is reduced to fit the screen size of slave screen 42.

Figure 6:
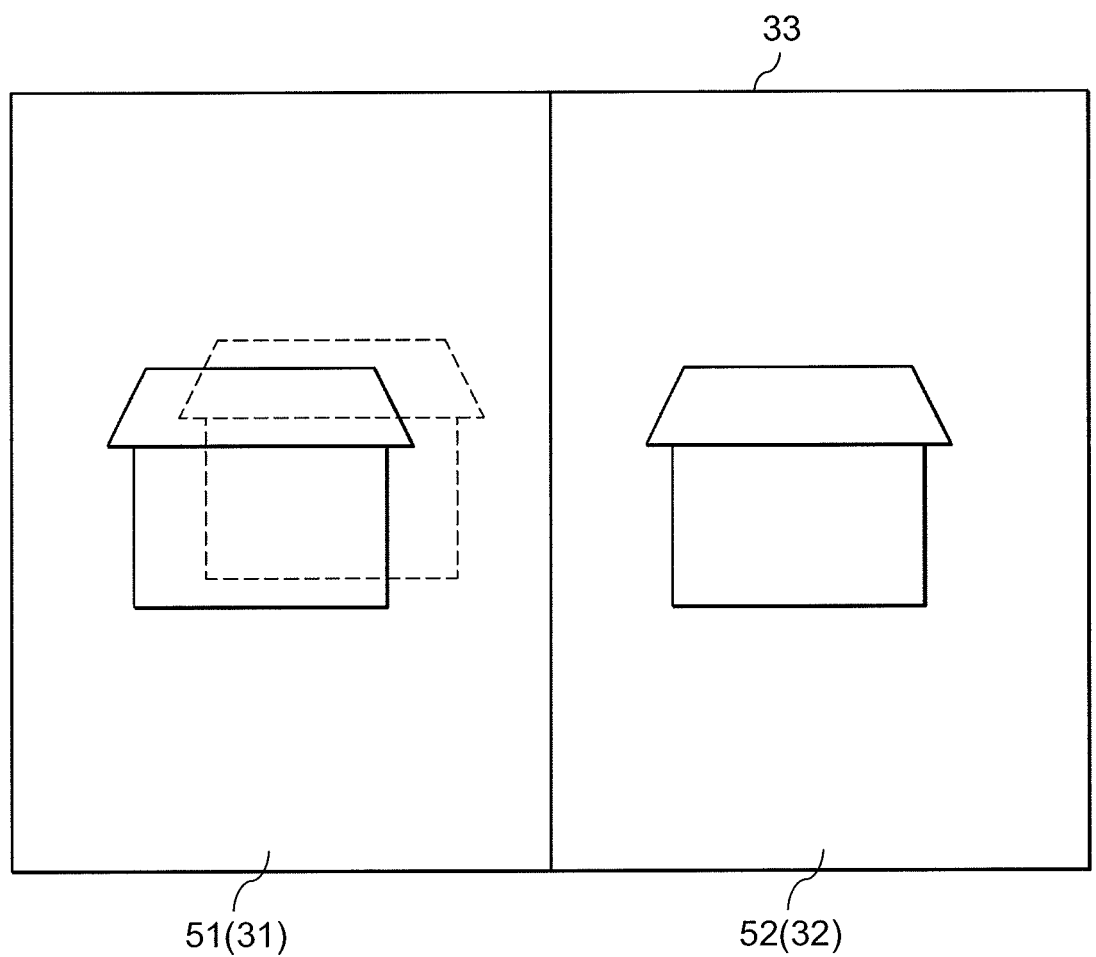
FIG. 6 is a diagram showing an example of a synthesized image synthesized by using a two-screen split method.

FIG. 6 is a diagram showing an example in which shaken image 31 and shake corrected image 32 are synthesized by using the two-screen split method. In the example of FIG. 6, synthesized image 33 is configured with first screen 51 and second screen 52 disposed side by side in the left-and-right direction. Shaken image 31 and shake corrected image 32 are synthesized such that shaken image 31 is disposed on first screen 51 on the left side and shake corrected image 32 is disposed on second screen 52 on the right side. The screen sizes of shaken image 31 and shake corrected image 32 are reduced so as to fit the screen sizes of first screen 51 and second screen 52, respectively.

Each screen size of first screen 51 and second screen 52 can be changed based on the command from the user which is input from monitoring device 2. In the example of FIG. 6, first screen 51 and second screen 52 have the same screen size, but the screen size may be changed such that one of first screen 51 and second screen 52 has a screen size larger or smaller than the other.

In the example of FIG. 6, the synthesis is performed such that shaken image 31 is disposed on first screen 51 on the left side and shake corrected image 32 is disposed on second screen 52 on the right side, but conversely, the synthesis may be performed such that shake corrected image 32 is disposed on first screen 51 on the left side and shaken image 31 is disposed on second screen 52 on the right side.

Further, in the example of FIG. 6, first screen 51 and second screen 52 constituting synthesized image 33 are disposed in the left-and-right direction, but first screen 51 and second screen 52 may be disposed in the up-and-down direction instead of the left-and-right direction.

Second Exemplary Embodiment

Figure 7:
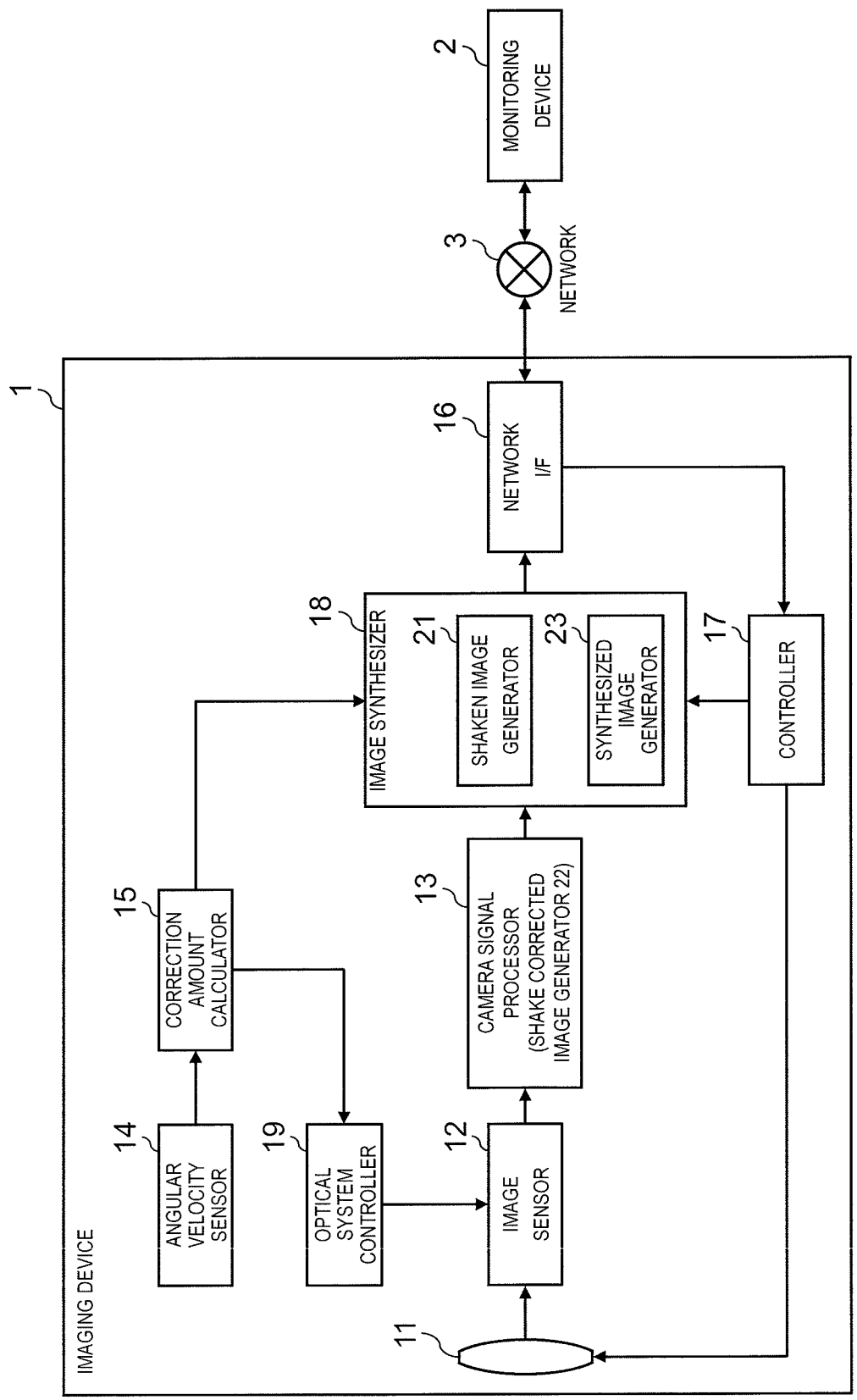
FIG. 7 is a schematic configuration diagram of an imaging device according to a second exemplary embodiment of the present disclosure.

FIG. 7 is a schematic configuration diagram of imaging device 1 according to a second exemplary embodiment of the present disclosure. In the second exemplary embodiment, matters not specifically mentioned below are the same as those in the first exemplary embodiment described above.

In the second embodiment, imaging device 1 further includes optical system controller 19, and optical system controller 19 corrects image shake by displacing image sensor 12 in a horizontal direction (x direction) and a vertical direction (y direction) based on the correction amount calculated by correction amount calculator 15. Therefore, the frame image generated by camera signal processor 13 becomes a shake corrected image in which the image shake is corrected. In the second exemplary embodiment, image sensor 12 can be regarded as shake corrected image generator 22 that generates a shake corrected image.

In the second exemplary embodiment, image synthesizer 18 includes shaken image generator 21 that generates a shaken image including image shake by performing a geometrical conversion with respect to a shake corrected image acquired from camera signal processor 13 based on a correction amount calculated by correction amount calculator 15, and synthesized image generator 23 that generates a synthesized image in which the shaken image and the shake corrected image are disposed on the same screen.

Figure 8:
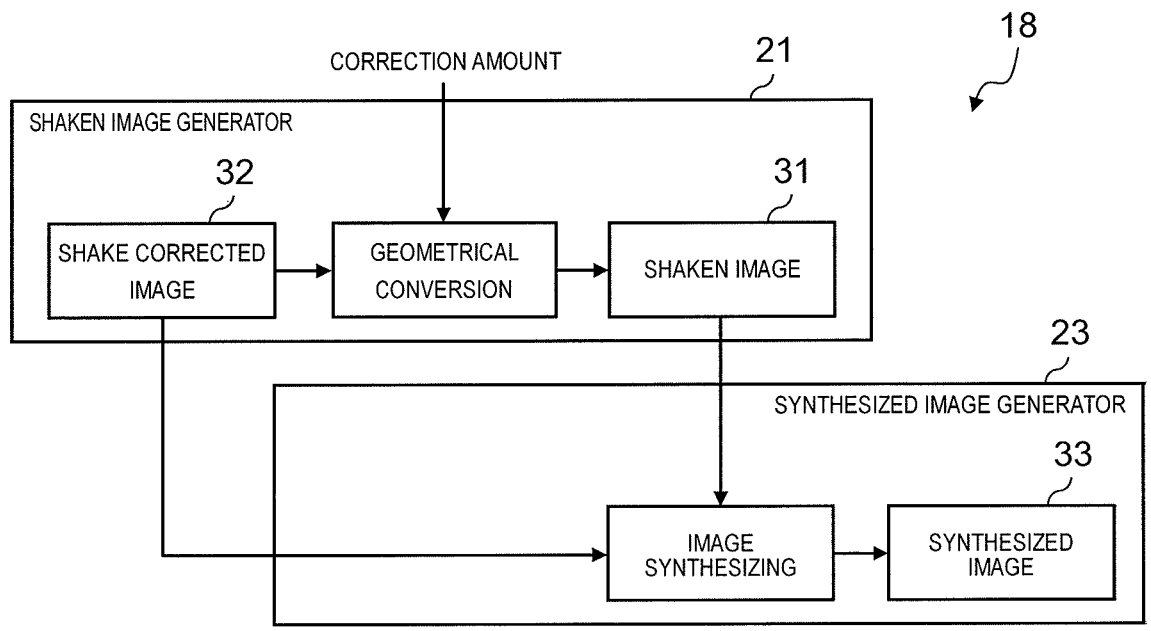
FIG. 8 is a diagram showing processing in an image synthesizer.
Figure 9:
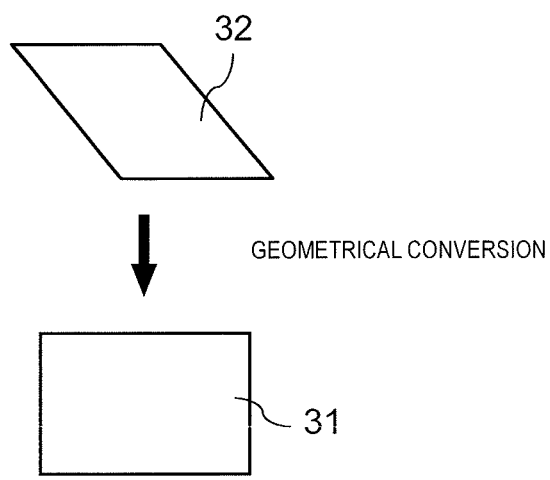
FIG. 9 is a diagram for explaining a geometrical conversion in a shaken image generator.

FIG. 8 and FIG. 9 are diagrams for explaining each processing in shaken image generator 21 and synthesized image generator 23 of image synthesizer 18.

First, shaken image generator 21 acquires a frame image (image data) of the current frame (frame N) from camera signal processor 13. As described above, the frame image generated by camera signal processor 13 is shake corrected image 32 in which the image shake is corrected. Shaken image generator 21 acquires a correction amount "Δx(N), Δy(N)" (See FIG. 2) of the current frame (frame N) from correction amount calculator 15.

Subsequently, as shown in FIG. 9, and based on the correction amount "Δx(N), Δy(N)" acquired from correction amount calculator 15, shaken image generator 21 generates shaken image 31 including image shake by performing a geometrical conversion with respect to shake corrected image 32 which is a frame image of the current image (frame N). Shaken image 31 is regarded as an image corresponding to the current frame image before correcting the image shake, and is used in place of the current frame by synthesized image generator 23.

Next, synthesized image generator 23 generates synthesized image 33 in which shaken image 31 that is in place of the current frame and shake corrected image 32 are synthesized such that both images are disposed on the same screen. A method of synthesizing shaken image 31 and shake corrected image 32 is the same as that of the above-described first exemplary embodiment, and thus the description thereof will be omitted.

Although the present disclosure has been described above based on specific exemplary embodiments, these exemplary embodiments are merely examples, and the present disclosure is not limited by these exemplary embodiments. In addition, not all of the components of the imaging device and the captured image display method according to the present disclosure described in the above exemplary embodiments are necessarily essential, and it is possible to make an appropriate selection at least without departing from the scope of the present disclosure.

For example, in the above exemplary embodiments, the correction amount for correcting the image shake in the current frame image is calculated based on the shake amount of imaging device 1 detected by the angular velocity sensor, but instead of the detection result of the angular velocity sensor, calculation may be made based on the displacement amount of the subject between the current frame image and a frame image which is one frame image before the current frame image.

INDUSTRIAL APPLICABILITY

An imaging device and a captured image display method according to the present disclosure are useful as an imaging device and a captured image display method that can display a captured image and a shake corrected image thereof on the same screen.

REFERENCE MARKS IN THE DRAWINGS

1 IMAGING DEVICE
2 MONITORING DEVICE
3 NETWORK
11 LENS SYSTEM
12 IMAGE SENSOR
13 CAMERA SIGNAL PROCESSOR
14 ANGULAR VELOCITY SENSOR
15 CORRECTION AMOUNT CALCULATOR
16 NETWORK INTERFACE (I/F)
17 CONTROLLER
18 IMAGE SYNTHESIZER
19 OPTICAL SYSTEM CONTROLLER
21 SHAKEN IMAGE GENERATOR
22 SHAKE CORRECTED IMAGE GENERATOR
23 SYNTHESIZED IMAGE GENERATOR
31 SHAKEN IMAGE
32 SHAKE CORRECTED IMAGE
33 SYNTHESIZED IMAGE
41 MASTER SCREEN
42 SLAVE SCREEN
51 FIRST SCREEN
52 SECOND SCREEN

The invention claimed is:

1. An imaging device for imaging captured images including a plurality of frame images in time series by an imaging element, the device comprising:
   an angular velocity sensor that detects a physical shake amount of the imaging device;
   a processor and a memory that stores an instruction, the imaging device further comprising, as a configuration when the processor executes the instruction stored in the memory:
      a correction amount calculator that calculates a correction amount for correcting image shake in a current frame image based on the physical shake amount;
      a shake corrected image generator that generates a shake corrected image in which the image shake is corrected by performing a geometrical conversion with respect to the current frame image based on the correction amount; and
      a synthesized image generator that generates a synthesized image in which the current frame image and the shake corrected image are disposed on a same screen when the angular velocity sensor detects that the physical shake amount of the imaging device reaches a threshold value.

2. The imaging device of claim 1,
   wherein the synthesized image is configured with a master screen and a slave screen which is disposed on the master screen, and
   wherein one of the current frame image and the shake corrected image is disposed on the master screen, and the other is disposed on the slave screen, by the synthesized image generator.

3. The imaging device of claim 2,
   wherein the synthesized image generator changes a screen size of at least one of the master screen and the slave screen, and a disposition position of the slave screen on the master screen, according to a command input from a user.

4. The imaging device of claim 1,
   wherein the synthesized image is configured with a first screen and a second screen disposed side by side in a left-and-right direction or up-and-down direction, and
   wherein one of the current frame image and the shake corrected image is disposed on the first screen, and the other is disposed on the second screen, by the synthesized image generator.

5. The imaging device of claim 4,
wherein the synthesized image generator changes screen sizes of the first screen and the second screen according to a command input from a user.

6. The imaging device of claim 1, further comprising as the configuration when the processor executes the instruction stored in the memory:
a shaken image generator that generates a shaken image including the image shake by performing the geometrical conversion with respect to the shake corrected image based on the correction amount,
wherein the synthesized image generator uses the shaken image instead of the current frame image.

7. A display method of captured images including a plurality of frame images imaged in time series by an imaging element, the method comprising:
detecting a physical shake amount of the imaging element;
calculating a correction amount for correcting image shake in a current frame image based on the physical shake amount;
generating a shake corrected image in which the image shake is corrected by performing a geometrical conversion with respect to the current frame image based on the correction amount; and
generating a synthesized image in which the current frame image and the shake corrected image are disposed on a same screen, when the detecting of the physical shake amount of the imaging element reaches a threshold value.

* * * * *